(12) United States Patent
Wang et al.

(10) Patent No.: US 10,482,624 B2
(45) Date of Patent: Nov. 19, 2019

(54) POSTURE ESTIMATION METHOD AND APPARATUS, AND COMPUTER SYSTEM

(71) Applicant: Beijing SenseTime Technology Development Co., Ltd, Beijing (CN)

(72) Inventors: Xiaogang Wang, Beijing (CN); Wei Yang, Beijing (CN); Wanli Ouyang, Beijing (CN); Hongsheng Li, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 63 days.

(21) Appl. No.: 15/856,608

(22) Filed: Dec. 28, 2017

(65) Prior Publication Data
US 2018/0122098 A1 May 3, 2018

Related U.S. Application Data

(63) Continuation of application No. PCT/CN2017/088815, filed on Jun. 16, 2017.

(30) Foreign Application Priority Data

Jun. 16, 2016 (CN) .......................... 2016 1 0431259

(51) Int. Cl.
*G06K 9/00* (2006.01)
*G06T 7/73* (2017.01)

(52) U.S. Cl.
CPC ............ *G06T 7/75* (2017.01); *G06K 9/00369* (2013.01); *G06T 2207/20081* (2013.01); *G06T 2207/20084* (2013.01); *G06T 2207/30196* (2013.01)

(58) Field of Classification Search
CPC combination set(s) only.
See application file for complete search history.

(56) References Cited

U.S. PATENT DOCUMENTS 9,530,047 B1 * 12/2016 Tang .................. G06K 9/00288
9,710,697 B2 * 7/2017 Tang .................. G06K 9/00268
(Continued)

FOREIGN PATENT DOCUMENTS

CN     103824062     5/2014
CN     104063677     9/2014
(Continued)

OTHER PUBLICATIONS

International Search Report of PCT/CN2017/088815 dated Sep. 20, 2017, 2 pp.

*Primary Examiner* — Alex Kok S Liew
(74) *Attorney, Agent, or Firm* — Lathrop Gage LLP

(57) ABSTRACT

The present application relates to post estimation methods and apparatuses, and computer systems, wherein the method includes: extracting a feature in each body part of body parts of an object in an image to generate feature maps for the each body part, wherein the each body part corresponds to at least one part type; predicting part type scores respectively for features in each of the feature maps and establishing part type score maps based on the predicted part type scores; optimizing, for at least one point in each of the part type score maps, the established part type score maps based on a message related to an adjacent body part of a body part corresponding to the point; and determining an estimated position and an estimated part type of the each body part based on the optimized part type score maps to obtain an estimated pose of the object.

18 Claims, 7 Drawing Sheets

(56) References Cited

U.S. PATENT DOCUMENTS

| | | | | |
|---|---|---|---|---|
| 9,798,959 B2* | 10/2017 | Tang | .................. | G06K 9/00234 |
| 9,811,718 B2* | 11/2017 | Sun | .................... | G06K 9/00281 |
| 10,037,457 B2* | 7/2018 | Tang | .................. | G06K 9/00281 |
| 2006/0098865 A1* | 5/2006 | Yang | .................. | G06K 9/00362 |
| | | | | 382/159 |
| 2009/0252423 A1* | 10/2009 | Zhu | .................... | G06K 9/00201 |
| | | | | 382/209 |
| 2011/0044498 A1* | 2/2011 | Cobb | ................... | G06T 11/206 |
| | | | | 382/103 |
| 2015/0077336 A1 | 3/2015 | Elangovan | | |
| 2015/0139485 A1* | 5/2015 | Bourdev | ............ | G06K 9/00362 |
| | | | | 382/103 |

FOREIGN PATENT DOCUMENTS

| | | |
|---|---|---|
| CN | 105069413 | 11/2015 |
| CN | 105389569 | 3/2016 |
| CN | 106127120 | 11/2016 |

* cited by examiner

POSTURE ESTIMATION METHOD AND APPARATUS, AND COMPUTER SYSTEM

CROSS-REFERENCE TO RELATED APPLICATIONS

This is a continuation application of International Patent Application No. PCT/CN2017/088815, filed on Jun. 16, 2017, which claims the priority of Chinese Patent Application No. 201610431259.0, entitled "Pose Estimation Methods and Apparatuses, and Computer Systems" filed on Jun. 16, 2016, the entire disclosures of which are incorporated herein by reference in their entirety.

TECHNICAL FIELD

The present disclosure relates to the field of computer vision technology, specifically to the field of pose estimation technical solution.

BACKGROUND

An articulated object is an object with articulations in the body. The pose estimation of the articulated object is one of the basic tasks in the field of computer vision, which solves the problem of locating parts of the object in an image and has many important applications such as motion recognition and human body tracking. The main challenge faced by the task lies in the high flexibility of the articulation, shading, clothing, lighting, disordered background, etc., resulting in difficulty in estimating the pose of the articulated object.

SUMMARY

Embodiments of the present application provide a pose estimation technical solution.

One aspect of the embodiments of the present application discloses a pose estimation method, the method including:

extracting a feature in each body part of two or more body parts of an object in an image to generate a plurality of feature maps for the each body part, wherein the each body part corresponds to at least one part type;

predicting part type scores respectively for features in each of the feature maps and establishing two or more part type score maps based on the predicted part type scores;

optimizing, for at least one point in each of the part type score maps, the established part type score maps based on a message related to an adjacent body part of a body part corresponding to the point; and determining an estimated position and an estimated part type of the each body part based on the optimized part type score maps to obtain an estimated pose of the object.

Another aspect of the embodiments of the present application discloses a pose estimation apparatus, the apparatus including: a processor; and instructions to cause the processor to perform operations, the operations comprising:

extracting a feature in each body part of two or more body parts of an object in an image to generate a plurality of feature maps for the each body part, wherein the each body part corresponds to at least one part type;

predicting part type scores respectively for features in each of the feature maps, and establishing two or more part type score maps based on the predicted part type scores;

optimizing, for at least one point in each of the part type score maps, the established part type score maps based on a message related to an adjacent body part of a body part corresponding to the point; and determining an estimated position and an estimated part type of the each body part based on the optimized part type score maps to obtain an estimated pose of the object.

Another aspect of the embodiments of the present application further discloses a computer program product, comprising a computer readable code; when the computer readable code runs in a device, a processor in the device executes an executable instruction for realizing pose estimation method according to the above-described embodiments of the present application.

Another aspect of the embodiments of the present application further discloses another computing device, including: a processor, a communication interface, a memory and a communication bus; the processor, the communication interface and the memory achieve mutual communication through the communication bus;

the memory is configured to store at least one instruction; the instruction causes the processor to perform operations of the steps in the pose estimation method according to any one of the above-described embodiments of the present application.

A further aspect of the embodiments of the present application further discloses a computer program, including a computer-readable code that, when the computer-readable code is operated on a device, a processor in the device executes an instruction for implementing the steps in the pose estimation method according to any one of the above-described embodiments of the present application.

Another aspect of the embodiments of the present application also discloses a non-transitory computer-readable medium for storing a computer-readable instruction, wherein the instruction is executed to implement operations of the steps in the pose estimation method according to any one of the above-described embodiments of the present application.

Based on the pose estimation methods and apparatuses, the computing devices, the computer systems, the computer programs and the non-transitory computer-readable mediums of the embodiments of the present application, by extracting a feature in each body part of two or more body parts of an object in an image to generate a plurality of feature maps for each of the body parts, predicting part type scores for features in each of the feature maps and establishing two or more part type score maps based on the predicted part type scores, optimizing, for at least one point in each of the part type score maps, the established part type score maps based on a message related to an adjacent body part of a body part corresponding to the point, and determining an estimated position and an estimated part type of the each body part based on the optimized part type score maps, an estimated pose of the object is obtained. The embodiments of the present application may optimize the established part type score maps based on a message related to an adjacent body part of a body part, determine an estimated position and an estimated part type of the each body part based on the optimized part type score maps to perform pose estimation such that the pose estimation result is more accurate and the accuracy of the pose estimation result is improved.

The technical solution of the present application will be described in further detail below with reference to the accompanying drawings and embodiments.

BRIEF DESCRIPTION OF THE DRAWINGS

Hereafter, exemplary and non-limiting embodiments of the present application are described with reference to the accompanying drawings. These drawings are merely illustrative and generally not representative of the exact proportions. Same or similar elements in different drawings are denoted by the same reference numerals. The present application may be more clearly understood from the following detailed description with reference to the accompanying drawings in which.

DETAILED DESCRIPTION OF THE EMBODIMENTS

Figure 1:
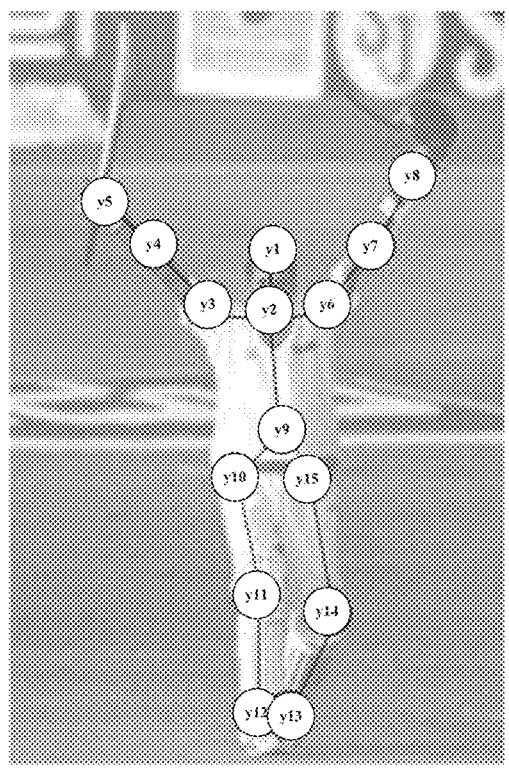
FIG. 1 shows a block diagram of an exemplary device adapted to implement the present application.

Various exemplary embodiments of the present application will now be described in detail with reference to the accompanying drawings. It should be noted that the relative arrangement, numerical expressions and numerical values of the components and steps set forth in these embodiments do not limit the scope of the present application, unless otherwise specified.

At the same time, it should be understood that, for ease of description, the sizes of the various parts shown in the accompanying drawings are not drawn according to actual proportions.

The following description of at least one exemplary embodiment is in fact merely illustrative and is in no way intended as a limitation to the present application and its application or use therewith.

Techniques, methods, and devices known to those of ordinary skill in the relevant art may not be discussed in detail, but where appropriate, the techniques, methods, and devices should be considered as part of the specification.

It should be noted that similar reference numerals and letters indicate similar items in the following accompanying drawings, therefore, once an item is defined in an accompanying drawing, there is no need to discuss the item further in the subsequent accompanying drawings.

The embodiments of the present application may be applied to a computer system/server, which may operate with a number of other general or specified computing system environments or configurations. Examples of well-known computing systems, environments and/or configurations adapted to use with the computer system/server include, but are not limited to: personal computer systems, server computer systems, thin clients, thick clients, handheld or laptop devices, microprocessor-based systems, set-top boxes, programmable consumer electronic products, network personal computers, small computer systems, large computer systems, and distributed cloud computing technological environments including any of the systems described above, etc.

The computer system/server may be described in the general context of computer system executable instructions (such as program modules) executed by a computer system. Typically, program modules may include routines, programs, target programs, components, logic, data structures, etc., which perform specific tasks or implement specific abstract data types. The computer system/server may be implemented in a distributed cloud computing environment. In the distributed cloud computing environment, tasks are executed by a remote processing device which is linked through a communication network. In the distributed cloud computing environment, program modules may locate on a local or remote computing system storage medium that includes storage devices.

In each of the embodiments of the present application, extracting a feature in each body part of two or more body parts of an object in an image to generate a plurality of feature maps for the each body part, predicting part type scores for features in each of the feature maps and establishing two or more part type score maps based on the predicted part type scores, optimizing, for at least one point in each of the part type score maps, the established part type score maps based on a message related to an adjacent body part of a body part corresponding to the point, and determining an estimated position and an estimated part type of each of the body part based on the optimized part type score maps, an estimated pose of the object is obtained. The embodiments of the present application optimize the established part type score maps based on a message related to an adjacent body part of a body part, determine an estimated position and an estimated part type of the each body part based on the optimized part type score maps to perform pose estimation, such that the pose estimation result is more accurate and the accuracy of the pose estimation result is improved.

In the present application:

The term "body part" is intended to describe a selected part of a body, for example, describing a part such as head, neck, shoulder, knee, ankle, as shown in FIG. 1, an exemplary body part $y_i$ (i=1, 2, . . . , 15) according to the present application is illustrated. However, the present application is not limited to the embodiments disclosed herein. For example, taking into account the accuracy or efficiency, the present application may include more or fewer body parts, or even completely different body parts.

Figure 2:
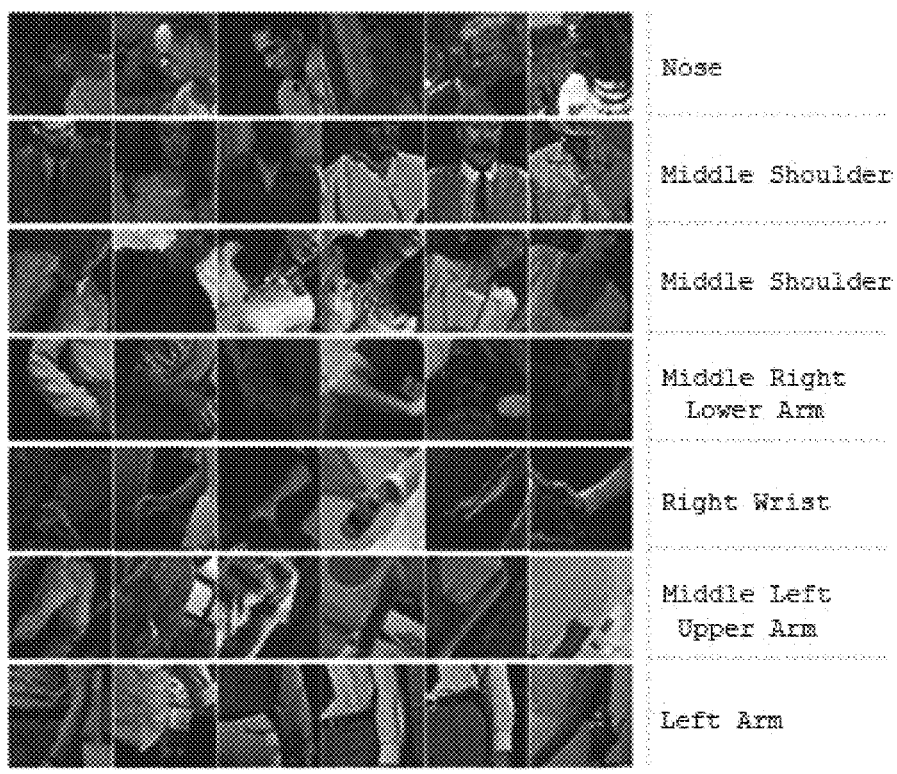
FIG. 2 shows an example of a combination of body parts according to the present application.

The term "part type" is intended to indicate combined information of a body part and an adjacent body part, for example, in an example of the present application, the part type is intended to represent a spatial relationship between a body part and an adjacent body part. For example, the part type of a wrist connected to an arm in a horizontal state (hereinafter referred to as the horizontal arm) is 1, and the part type of a wrist connected to an arm in a vertical state (hereinafter referred to as the vertical arm) is 2. Each part type corresponds to a set of body parts examples with similar relative positions. FIG. 2 shows some examples of spatial relationships of seven exemplary body parts (i.e., nose, middle shoulder, middle right lower arm, right wrist, middle left upper arm and left arm). The combined information obtained from the relative position has a strong correlation with the appearances of the body parts. For example, the horizontal arm corresponds to one part type, and the vertical arm corresponds to another part type. These two part types are different in the pose configuration and appearance. In the embodiments of the present application, the number of the part types of the body parts may be predetermined and the number of the part types of the body parts may be adjusted according to actual needs. The number of the part types of different body parts may be the same or different. The present application is not intended to be limited thereto.

The term "feature map" is intended to indicate features extracted from an image. Each point in a feature map corresponds to an image patch in the image whose center is the point corresponding to the point in the feature map in the image.

The term "Convolutional Neural Network (CNN)" is intended to indicate various types of neural networks for machine learning.

The term "maximum a posteriori" is intended to describe an acquisition of an estimation of a point that is difficult to observe by using an extended optimization objective based on empirical data. Here, the extended optimization objective combines a prior probability distribution of an expected estimate.

The term "back propagation algorithm." is intended to describe a general method for training neural networks used in combination with an optimization method (e.g., a gradient descent method). The method is used to calculate the loss function for the gradient of all weights in the neural network. The gradient is fed back to the optimization method such that the optimization method uses the gradient to update values of the weights in the neural network as an attempt to minimize the loss function.

Figure 3:
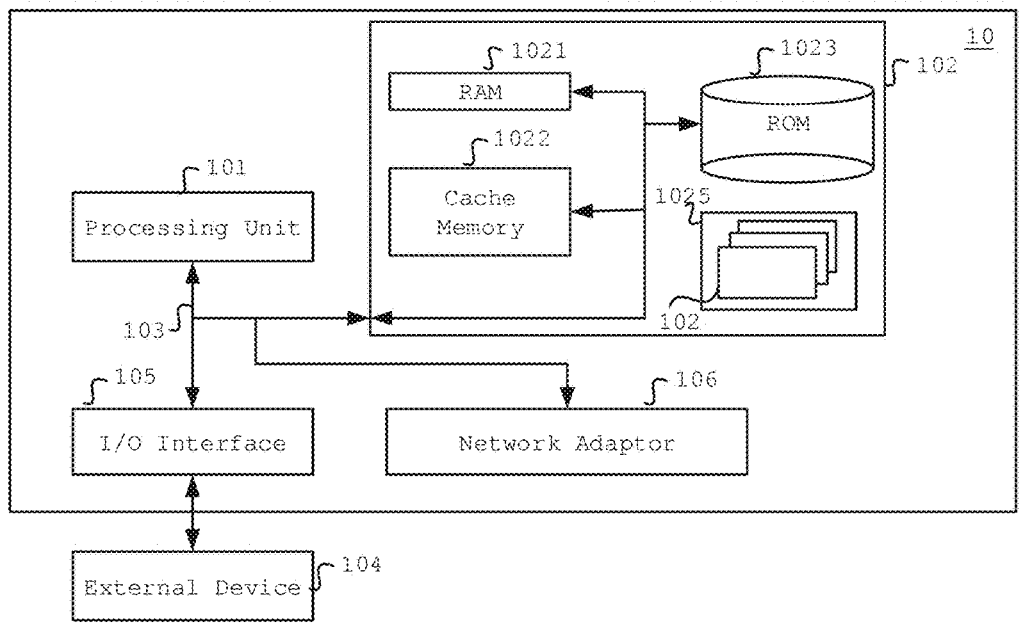
FIG. 3 shows a schematic structural diagram of an exemplary device adapted to implement the present application.

FIG. 3 shows a block diagram of an exemplary device 10 (for example, computer system/server) adapted to implement the present application. The device 10 shown in FIG. 3 is merely an example and should not impose any limitation on the functionality and scope of use of the present application.

As shown in FIG. 3, the device 10 may be presented in the form of a general device. The components of the device 10 may include, but are not limited to, one or more processing units 101 (i.e., processors), a system memory 102, a bus 103 connecting different system components (including the system memory 102 and the processing unit 101). The device 10 may include a variety of computer system readable mediums. These mediums may be any available mediums that can be accessed by the device 10, including volatile and non-volatile mediums, removable and non-removable mediums, etc.

The system memory 102 may include a computer system readable medium in the form of a volatile memory, for example, a random access memory (RAM) 1021 and/or a cache memory 1022. The device 10 may further include other removable/non-removable, volatile/non-volatile computer system storage mediums. By way of example only, the ROM 1023 may be used to read and write a non-removable, non-volatile magnetic medium (not shown in FIG. 3, commonly referred to as a "hard disk drive"). Although not shown in FIG. 3, the system memory 102 may provide a disk drive used to read and write a removable, non-volatile disk (e.g., a "floppy disk"), as well as an optical disk drive to read and write a removable, non-volatile optical disk (e.g., a CD-ROM, a DVD-ROM, or other optical mediums). In these cases, each driver may be connected to the bus 103 via one or more data medium interfaces. The system memory 102 may include at least one program product. The program product has a set of (e.g., at least one) program modules that are configured to perform the functionality of the present application.

A program/utility tool 1025 having a set of (at least one) program modules 1024 may be stored in, for example, the system memory 102, such program module 1024 may include, but is not limited to, an operating system, one or more applications, other program modules and program data. Each or some combination of these examples may include an implementation of the network environment. The program module 1024 generally performs the functionality and/or method described in the present application.

The device 10 may also communicate with one or more external devices 104 (e.g., a keyboard, a pointing device, a display, etc.). Such communication may be made via an input/output (I/O) interface 105, and the device 10 may also communicate with one or more networks (e.g., a local area network (LAN), a wide area network (WAN) and/or a public network such as the Internet) through a network adapter 106. As shown in FIG. 3, the network adapter 106 communicates with other modules (e.g., the processing unit 101, etc.) of the device 10 through the bus 103. It should be understood that, although not shown in FIG. 3, other hardware and/or software modules may be used through the device 10.

The processing unit 101 executes various function applications and data processing by operating computer programs stored in the system memory 102, for example, executing instructions for implementing the steps in the pose estimation method of each of the embodiments of the present application. For example, in a specific example, the processing unit 101 may execute a computer program stored in the system memory 102, and when the computer program is being executed, the following steps are performed: extracting a feature in each body part of two or more body parts of an object in an image to generate a plurality of feature maps for the each body part, wherein the each body part corresponds to at least one part type; predicting part type scores respectively for features in each of the feature maps and establishing two or more part type score maps based on the predicted part type scores; optimizing, for at least one point in each of the part type score maps, the established part type score maps based on a message related to an adjacent body part of a body part corresponding to the point; and determining an estimated position and an estimated part type of the each body part based on the optimized part type score maps to obtain an estimated pose of the object.

Figure 4:
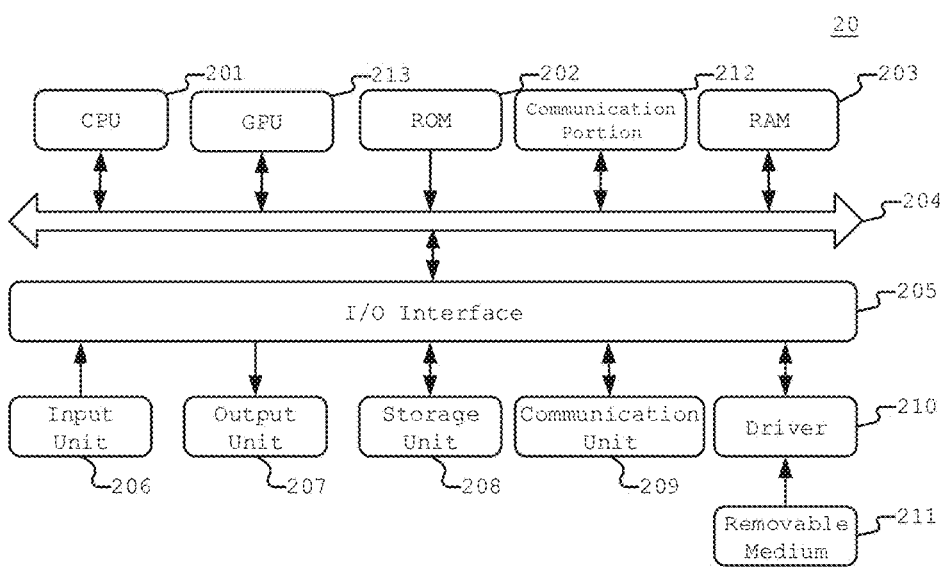
FIG. 4 shows a schematic structural diagram of an exemplary device adapted to implement the present application.

FIG. 4 shows a schematic structural diagram of an exemplary device adapted to implement the present application. Here, the device 20 may be a mobile terminal, a personal computer (PC), a tablet computer, a server, etc. In FIG. 4, the computer system 20 includes one or more processors, a communication portion, etc. The one or more processors may be: one or more central processing units (CPUs) 201 and/or one or more image processor (GPUs) 213, etc. The processor may perform various suitable actions and processes in accordance with executable instructions stored in the read-only memory (ROM) 202 or executable instructions loaded from the storage unit 208 into the random access memory (RAM) 203. The communication portion 212 may include, but is not limited to a network card. The network card may include, but is not limited to an IB (Infiniband) network card. The processor may communicate with the read-only memory 202 and/or the random access memory 230 to execute the executable instructions, connect to the communication portion 212 through the bus 204 and communicate with other target devices through the communication portion 212 to complete the corresponding step in the present application. In a specific example of the present application, the steps performed by the processor includes: extracting a feature in each body part of two or more body parts of an object in an image to generate a plurality of feature maps for the each body part, wherein the each body part corresponds to at least one part type; predicting part type scores respectively for features in each of the feature maps and establishing two or more part type score maps based on the predicted part type scores; optimizing, for at least one point in each of the part type score maps, the established part type score maps based on a message related to an adjacent body part of a body part corresponding to the point; and determining an estimated position and an estimated part type of the each body part based on the optimized part type score maps to obtain an estimated pose of the object.

In addition, in the RAM 203, various programs and data required by operation of the apparatus may also be stored. The CPU 201, the ROM 202 and the RAM 203 are connected to each other through the bus 204. In the case of having the RAM 203, the ROM 202 is an optional module. The RAM 203 stores executable instructions or writes executable instructions to the ROM 202 during operation, and the executable instructions cause the central processing unit 201 to perform the steps included in the pose estimation method of any of the embodiments of the present application. The input/output (I/O) interface 205 is also connected to the bus 204. The communication portion 212 may be integrated, and may also be provided with a plurality of submodules (e.g., a plurality of IB network cards) and connected to the bus, respectively.

The following components are connected to the I/O interface 205: an input unit 206 including a keyboard, a mouse, and the like; an output unit 207 including such as a cathode ray tube (CRT), a liquid crystal display (LCD) and a loudspeaker, and the like; a storage unit 208 including a hard disk, and the like; and a communication unit 209 including a network interface card such as a LAN card, a modem, and the like. The communication unit 209 performs communication processing via a network such as the Internet. A driver 210 also connects to the I/O interface 205 as needed. A removable medium 211, such as a magnetic disk, an optical disk, a magneto-optical disk, a semiconductor memory, is installed on the driver 210 as needed so that computer programs read therefrom are installed in the storage unit 208 as needed.

It should be noted that the architecture shown in FIG. 4 is only an alternative implementation. During the specific practice process, the number and types of parts as shown in FIG. 4 may be selected, deleted, added or replaced according to actual needs. Upon setting different functional parts, implementations such as separate setting or integrated setting may also be adopted, for example, the GPU and the CPU may be set separately, and again for the same reason, the GPU may be integrated on the CPU, the communication portion may be set separately, and may also be set integrally on the CPU or GPU. These alternative implementations all fall within the protection scope of the present application.

In particular, according to the embodiments of the present application, the process described below with reference to the flowchart may be implemented as a computer software program, for example, the embodiments of the present application include a computer program product, which includes a computer program tangible included in a machine-readable medium. The computer program includes a program code for performing the steps shown in the flowchart. The program code may include corresponding instructions to perform correspondingly the steps in the pose estimation method provided by any of the embodiments of the present application, for example, extracting a feature of each body part in two or more body parts of an object in an image to generate instructions of a plurality of feature maps for each of the body parts, wherein each of the body parts corresponds to at least one part type; predicting part type scores respectively for features in each of the feature maps and establishing instructions of two or more part type score maps based on the predicted part type scores; optimizing, for at least one point in each of the part type score maps, the established instructions of part type score maps based on a message related to an adjacent body part of a body part corresponding to the point; determining an estimated position and an estimated part type of the each body part based on the optimized part type score maps to obtain an estimated pose of the object.

In such embodiments, the computer program may be downloaded and installed from the network through the communication unit 209, and/or installed from the removable medium 211. When the computer program is executed by the central processing unit (CPU) 201, the above-described instruction described in the present application is executed.

Hereinafter, the pose estimation technical solution provided by the embodiments of the present application will be described in detail with reference to the detailed description and the accompanying drawings.

Figure 5:
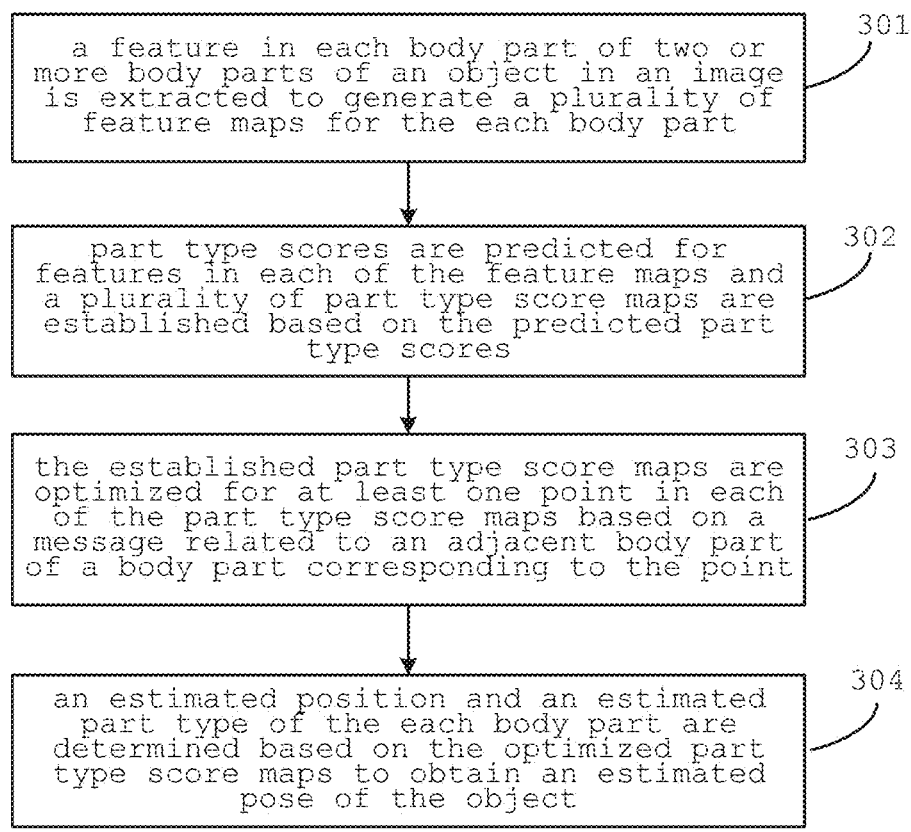
FIG. 5 shows a flow chart of a pose estimation method according to embodiments of the present application.

FIG. 5 shows a flow chart of a pose estimation method according to embodiments of the present application. The pose estimation method in the embodiments of the present application may be exemplarily performed by a processor in the device. As shown in FIG. 5, the pose estimation method of this embodiment includes:

In step 301, a feature in each body part of two or more body parts of an object in an image is extracted to generate a plurality of feature maps for the each body part, wherein the each body part corresponds to at least one part type.

Here, the image may be a still image, and may also be a frame of an image of a video, and the present application is not limited to be limited thereto.

Specifically, in the step 300, a feature map is generated for each part type of each of the body parts. It should be understood by those skilled in the art that the feature of each body part in the image may be extracted using a variety of methods to generate the feature map. For example, in an alternative method, the generated feature is used to detect the body part in the image by means of a supervised classifier, and the corresponding feature of the body part is extracted to generate a feature map. Here, the generated features is, for example, the histogram of Oriented Gradient (HOG) and color histogram feature, the supervised classifier is, for example, the latent SVM or the ascending random forest algorithm. According to one of the embodiments of the present application, the feature of each body part of two or more body parts of the object in the image may be extracted by, for example but not limited to, a convolutional neural network (CNN) to generate a feature map.

In the present application, the value of each point in the feature map (i.e., pixel) is a feature, respectively, and each feature indicates a response of a neuron of the CNN to an image patch input in the image. For example, if the neuron has a higher response to a circle, then in the feature map the point corresponding to an occurrence of a circle in the input image may have a greater value.

For example, the operation of the step 301 may specifically be performed by an extraction module 801 that is operated by the processor.

In step 302, part type scores are predicted respectively for features in each of the feature maps and two or more part type score maps are established based on the predicted part type scores.

The part type scores of a part type of a body part predicted at each point in the feature map constitute the part type score map of the part type of the body part. The value at each point in the part type score map of a certain part type of a certain body part indicates the possibility that the image patch corresponding to the point corresponds to the body part of the part type, i.e., the credibility of the body part corresponding to the point. According to the embodiments of the present application, the part type score may be obtained by, for example, but not limited to, a Softmax function unit and a Logarithmic function unit, in which the Softmax function unit performs softmax function to the value at each point (i.e., each feature) in the feature map, i.e., the Softmax function unit performs part type classification according to the value at each point in the feature map, then the Logarithmic function unit performs a log function to the value obtained after the processing of the Softmax function unit to obtain the part type score, but the present application is not limited thereto. Here, the Softmax function is a classification function. The Softmax function is used as a network layer in the neural network and may be used for performing multi-classification.

For example, the operation of the step 302 may specifically be performed by a prediction module 802 that is operated by the processor.

In step 303, the established part type score maps are optimized for at least one point in each of the part type score maps based on a message related to an adjacent body part of a body part corresponding to the point.

In the embodiments of the present application, the at least one point may be selected and obtained by performing, for example, but not limited to noise reduction processing, sampling processing, filtering processing, etc., to each of the part type score maps.

In the embodiments of the present application, the message may include the credibility of the adjacent body part of the body part corresponding to the point, i.e., the probability that the adjacent body part of the body part corresponding to the point is the body part of a certain part type. In the embodiments of the present application, the credibility of the adjacent body part may be determined based on the part type score maps of the adjacent body part of the body part corresponding to the point.

As shown in FIG. 1, the body part may be modeled as a tree structure. In addition, the body part may also be modeled as a cyclic structure. In this context, the present application uses a cyclic structure as an example to explain the message passing process according to the embodiments of the present application, and it will be apparent to those skilled in the art that the present application is also applicable to a tree structure. In the embodiments of the present application, the established part type score map is optimized by a credibility propagation algorithm based on the message related to the adjacent body part of the body part corresponding to the point. However, it may be appreciated by those skilled in the art that the established part type score map may also be optimized by other algorithms, for example, but are not limited to, methods such as variance analysis, factor analysis, regression analysis.

In a specific example of the present application, the message passing process related to the adjacent body part of the body part and the optimization processing of the established part type score map may be performed by the message passing unit. Specifically, in this step, for each point in each of the part type score maps, the message passing unit updates the value at each point in the type score map based on the message related to the adjacent body part of the body part corresponding to the point, i.e., updates the credibility of the body part corresponding to each point in the type score map, for example, the credibility $u_i$ $(l_i, l_t)$ of the body part i in the following formula (3), thereby optimizing the established part type score map such that the part type score map is more accurate. In the embodiments of the present application, the message may further include the spatial compatibility between the body part and the adjacent body part, i.e., the relative position relationship that should be satisfied in space between the body part and the adjacent body part. For example, as shown in the left part of FIG. 6, the body part is modeled as a cyclic structure. The message passing unit is shown as in the right part of FIG. 6. For example, the adjacent body part of the body part "neck" include head, left shoulder and right shoulder, therefore for the neck, the message passing unit optimizes the part type score maps of the head, the left shoulder and the right shoulder based on the message related to the neck, and optimizes the part type score map of the neck based on the messages related to the head, the left shoulder and the right shoulder. The message passing unit may pass the message by performing a max-sum credibility propagation algorithm. However, it will be apparent to those skilled in the art that other suitable methods may also be adopted.

In the embodiments of the present application, it is also possible to determine the spatial compatibility between the body part and the adjacent body part based on the relative position information between the body part and the adjacent body part before the step. Before determining the spatial compatibility between the body part and the adjacent body part, the method according to the embodiments of the present application further includes determining the relative position information based on a first distance and a second distance, wherein the first distance represents a distance between the body part and the adjacent body part in an x-axis direction, and the second distance represents a distance between the body part and the adjacent body part in a y-axis direction. In the embodiments of the present application, the relative position information may be determined based on the first distance, the second distance, the square of the first distance and the square of the second distance. Specifically, the spatial compatibility $\psi$ of the two adjacent body parts i and j may be defined by the formula (1):

$$\psi(l_i, l_j, t_i, t_j | I; \omega_{i,j}^{t_i,t_j}) = \langle \omega_{i,j}^{t_i,t_j}, d(l_i - l_j) \rangle \tag{1}$$

Figure 7:
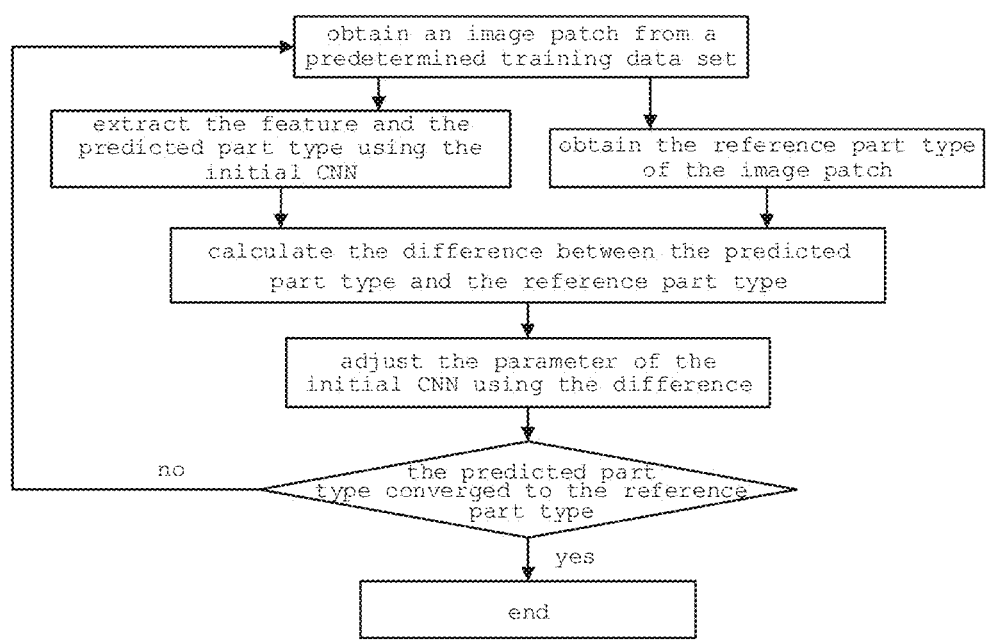
FIG. 7 shows a flow chart of training a CNN according to the embodiments of the present application.

Here, $l_i = (x_i, y_i)$ represents the pixel position of the body part, t represents the part type of the body part, $d(l_i, l_j)$ is the deformation feature defined by $d(l_i - l_j) = (\Delta x\ \Delta x^2\ \Delta y\ \Delta y^2)^T$, $\Delta x = x_i - x_j$ and $\Delta y = y_i - y_j$ are the relative positions of the body part i relative to the body part j, and $\omega_{i,j}^{t_i,t_j}$ is the four-dimensional deformation weight and the value of the $\omega_{i,j}^{t_i,t_j}$ may be obtained by a training procedure, for example, the embodiment shown in FIG. 7. In the present application, by means of the quadratic deformation constraint shown by the formula (1), the parameter space may be reduced in a regularized mode. However, it may be appreciated by those skilled in the art that the space compatibility between the body part and the adjacent body part may be determined based on information such as the first distance and the second distance, and the weight of at least one of the first distance and/or the second distance.

The message passing process of the present application will be described in detail below. For the body part j, the message obtained by the message passing unit from the adjacent body part i is defined as $m_{ij}$ ($l_j$; $t_j$), and the credibility of the body part i is defined as $u_i$ ($l_i$; $t_i$). The credibility $u_i$ ($l_i$; $t_i$) of the body part i may be determined according to the following: the value corresponding to the pixel position l in the part type score map of the body part i with the part type $t_i$; and information related to the adjacent body part of the body part i. For the body part j, the message $m_{ij}$ ($l_j$; $t_j$) obtained from its adjacent body part i may be determined according to the following method: the maximum value of the sum of the spatial compatibility between each body part i and the body part j and the credibility of the body part i. In the embodiments of the present application, the message passing unit, for example, may update the message and the credibility according to the rules (2) and (3):

$$m_{ij}(l_j, t_j) \leftarrow \alpha_m \max_{l_i, t_i}(u_i(l_i, t_i) + \psi(l_i, l_j, t_i, t_j)) \qquad (2)$$

$$u_i(l_i, t_i) \leftarrow \alpha_u \left( \phi(l_i, t_i) + \sum_{k \in N(i)} m_{ki}(l_i, t_i) \right) \qquad (3)$$

Figure 8:
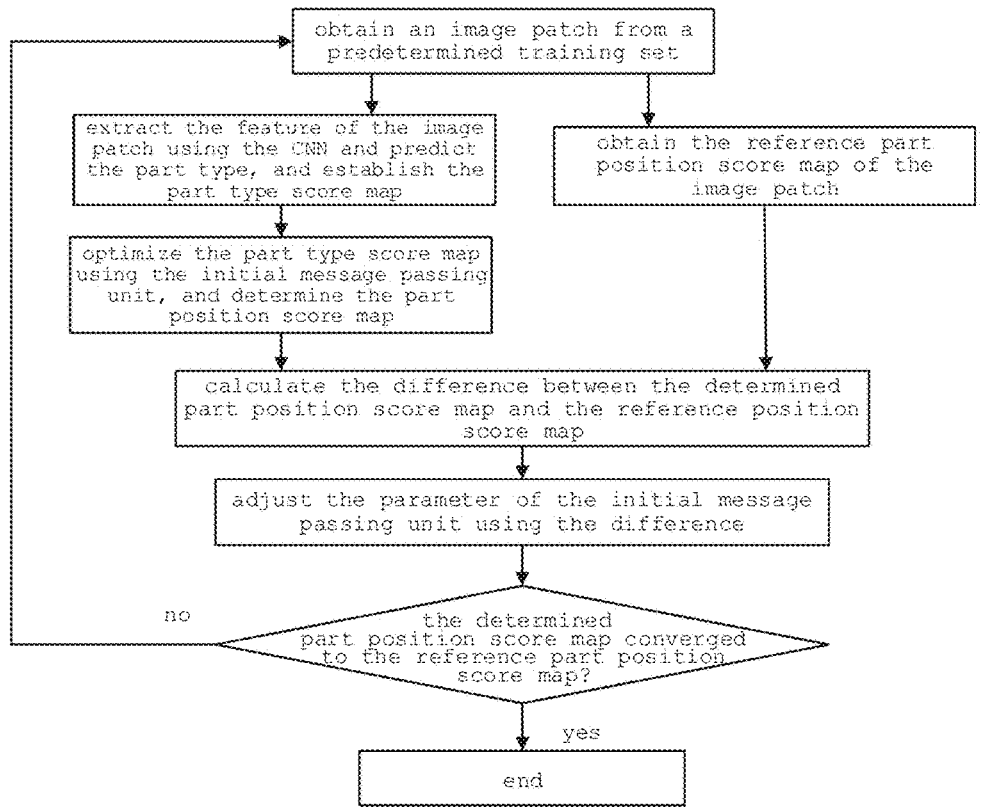
FIG. 8 shows a flow chart of a training message passing unit according to the embodiments of the present application.

Here, $\alpha_m$ and $\alpha_u$ are normalized items and their specific values may be obtained by, for example, the training procedure of the embodiment shown in FIG. 8, and in one of the specific examples of the present invention, the values of $\alpha_m$ and $\alpha_u$ may be specific as 1. And N(i) represents the set of adjacent body parts of the body part i, and $\phi(l_i,t_i)$ is the logarithmic probability output by the Logarithmic function unit. To simplify the mark, the model parameter is omitted herein. In this context, the flooding schedule is used to perform the message passing process. According to the flooding schedule, at each time step, the message is passed in both directions of each connection simultaneously, therefore the passing efficiency of the message is high.

Figure 6:
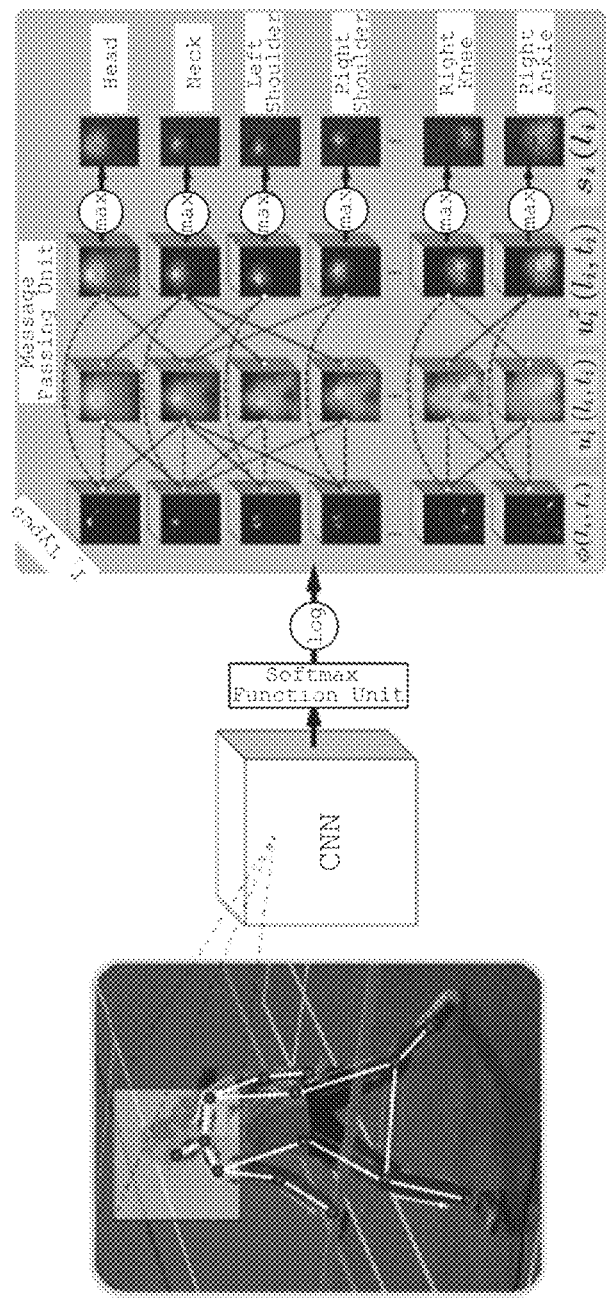
FIG. 6 shows a schematic diagram of a pose estimation method according to the embodiments of the present application.

As shown in the right part of FIG. 6, each message passing unit performs the credibility propagation iteration for one time by utilizing the flooding schedule and according to the formulas (2) and (3). The message passing unit causes each body part to simultaneously send a message to each of its adjacent body parts (indicated as a solid line connection) and updates the credibility of each node (indicated as a dashed line connection) by summing the unity potential of the node with all incoming messages at each node. In the embodiments of the present embodiment, all messages are initialized to constant functions at the beginning of the credibility propagation iteration.

Although credibility propagation may require multiple iterations to converge, it is observed that the concatenation of three message passing units may be sufficient to produce a satisfactory result. It will be apparent, however, to those skilled in the art that more or fewer message passing units may be used, and the present application is not intended to be limited thereto.

For example, the operation of step 303 may specifically be performed by an optimization module 803 that is operated by the processor.

In step 304, an estimated position and an estimated part type of the each body part are determined based on the optimized part type score maps to obtain an estimated pose of the object.

In the embodiments of the present application, for each body part, the position having the highest score may be selected as the position of the body part and the part type corresponding to the position of the body part may be selected as the part type of the body part in the optimized part type score map. However, it may be appreciated by those skilled in the art that the estimated position and the estimated part type of each of the body parts may also be determined through other methods, such as, but are not limited to, selecting a position with a score exceeds a preset threshold in the optimized part type score map as the position of the body part, or selecting a position with the maximum value as the position of the body part after performing weighting processing to the optimized part type score map, or selecting a position with a maximum score in the optimized part type score map as the position of the body part.

For example, in the embodiments of the present application, after the credibility propagation is converged, an optimal pose estimation is obtained by selecting the position and type with the greatest credibility for each of the body parts. For example, the estimated position and the estimated part type of the body part may be obtained by the formula (4):

$$(l_i^*, t_i^*) = \arg\max_{l_i, t_i} u_i^*(l_i, t_i), \forall i \in \{1, \ldots, K\} \qquad (4)$$

Here, $u_i^*(l_i,t_i)$ is the credibility calculated in the last iteration, which is the maximum posterior of the specific position and the specific part type, $(l_i^*,t_i^*)$ is the maximum posterior assignment and K represents the number of the body parts.

In the present application, by using the body part type and for example, the quadratic deformation constraint of the spatial compatibility shown by the formula (1), the false positive region, i.e., the body part region which does not actually belong to certain body part type, may be excluded, and the size of the parameter space may be reduced, thus the estimation of the object pose is more effective and more accurate.

For example, the operation of the step 304 may specifically be performed by a determining module 804 that is operated by the processor.

In order to be able to take into account the combination of the body parts, the CNN may be pre-trained by a partial image patch having and using the part type. The existing human pose data set is labeled with the body part position 1, but there is no part type t. Assuming that $r_{ij}$ represents the relative position from the body part i to its adjacent body part j, the relative position $r_{ij}$ is clustered into $T_i$ clusters on the training set. As shown in FIG. 1, two body parts connected by the side are adjacent body parts. Each cluster corresponds to a set of example parts with similar relative positions, and the part type for each of the body parts may be exported by the cluster members. Then, the real part type is obtained for the data set. In the present application, the cluster may be obtained by K-means clustering. However, the present application is not intended to be limited thereto.

In the embodiments of the present application, an initial CNN may be trained based on the difference between the part type predicted by the initial CNN from a feature map of an image patch extracted from a preset training data set and the reference part type of the preset training data set, and the CNN is thus obtained. Here, the training data set includes a plurality of image patches, and the reference part type is a more realistic and accurate part type marked to the image patch. Here, the image patch is, for example, an image region corresponds to a certain part type in the image.

FIG. 7 shows a flow chart of training to obtain a CNN according to the embodiments of the present application. As shown in FIG. 7, the CNN may be trained and obtained by the following steps:

1) obtaining an image patch and a corresponding reference part type from a predetermined training data set;

2) extracting the training data set using the initial CNN to obtain the feature of the image patch and predicting the part type;

3) calculating the difference between the predicted part type and the reference part type; and 4) adjusting the parameter of the initial CNN using the difference to obtain the CNN from the initial CNN.

The steps 1) to 4) in the embodiment shown in FIG. 7 are repeatedly performed until the predicted part type converges to the reference part type, and the CNN is obtained. Here, the step 4) may be performed by, for example, the back propagation algorithm, but is not limited thereto.

For example, the step 3) to 4) in the flow shown in FIG. 7 may be performed by a network training module 805 that is operated by the processor.

In the embodiments of the present application, the initial message passing unit may be trained based on the difference between the part position score map predicted by the initial message passing unit from a preset training set and the reference part position score map of the preset training set, and the message passing unit is thus obtained. Here, the training set includes a plurality of image patches, and the reference part position score map is a more realistic and accurate part position score map of the image patch. Here, the image patch is, for example, an image region corresponding to a certain part type in the image.

FIG. 8 shows a flow chart of training and obtaining a message passing unit according to the embodiments of the present application. As shown in FIG. 8, the message passing unit may be trained and obtained by the following steps:

1) obtaining an image patch and a corresponding reference part position score map from a predetermined training set;

2) extracting the feature of the image patch in the training set using the CNN and predicting the part type, and establishing the part type score map;

3) optimizing the part type score map using the initial message passing unit and determining the part position score map based on the optimized part type score map;

4) calculating the difference between the determined part position score map and the reference part position score map; and 5) adjusting the parameter of the initial message passing unit using the difference to obtain the message passing unit from the initial message passing unit.

The steps 1) to 5) in the embodiment shown in FIG. 8 are repeatedly performed until the predicted part type score map converges to the reference part position score map, and the message passing unit is obtained. The step 5) for example, may be performed by using the back propagation algorithm, but is not limited thereto. Here, the adjusted parameter in step 5) includes, for example, but not limited to the normalized items $\alpha_m$ and $\alpha_u$ in the above rules (2) and (3). In the present application, the existing human pose training data set is marked with the body part position (i.e., real position), but without the part type. The real part position score map is a binarized graph and is generated by setting the value of the distance l relative to the real position at the point less than or equal to the threshold as 1, and setting the value of the distance l relative to the real position at the point greater than the threshold as −1.

According to the embodiments of the present application, in the step 5) of the embodiment shown in FIG. 8, the parameters of the CNN and the message passing unit may be jointly adjusted by the difference between the determined part position score map and the real part position score map. By joint training of the CNN and the message passing unit, it is possible to effectively reduce the fuzziness and the difficulty in mining by combining the overall pose and training consistently. By means of the quadratic deformation constraint, the parameter space may be reduced in a regularized mode.

For example, the step 4) to 5) in the flow shown in FIG. 8 may be performed by a unit training module 805 that is operated by the processor.

It may be appreciated by those skilled in the art that although the present application is described in connection with an example of estimating a human pose in an image, the pose estimation method according to the embodiments of the present application may also be used for the estimation of pose of other objects (e.g., animals, toys, etc.). The present application is not intended to be limited thereto.

Figure 9:
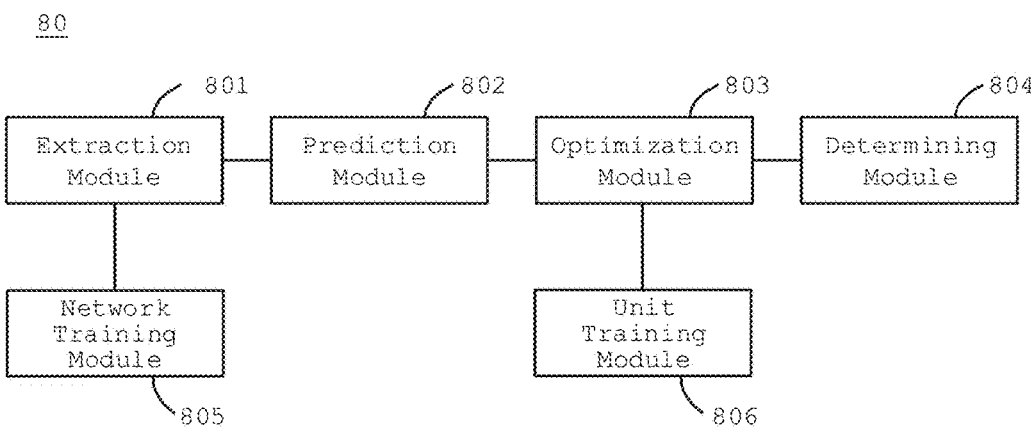
FIG. 9 shows a schematic diagram of a pose estimation apparatus according to the embodiments of the present application.

With reference to FIG. 9, a schematic diagram of a pose estimation apparatus according to the embodiments of the present application is shown.

As shown in FIG. 9, the pose estimation apparatus 80 may include: an extraction module 801, a prediction module 802, an optimization module 803, a determining module 804, a network training module 805 and a unit training module 806.

The extraction module 801 is configured to extract a feature in each body part of two or more body parts of an object in an image to generate a plurality of feature maps for the each body part, wherein the each body part corresponds to at least one part type.

The prediction module 802 is configured to predict part type scores respectively for features in each of the feature maps and establish two or more part type score maps based on the predicted part type scores.

The optimization module 803 is configured to optimize, for at least one point in each of the part type score maps, the established part type score maps based on a message related to an adjacent body part of a body part corresponding to the point.

The determining module 804 is configured to determine an estimated position and an estimated part type of the each body part based on the optimized part type score maps to obtain an estimated pose of the object.

It should be understood by those skilled in the art that the extraction module 830 may extract a feature by implementing a variety of methods. For example, the extraction module 830 may detect the body part in the image through a manually generated feature (such as a HOG and a color histogram) by means of a supervised classifier, such as the latent SVM or the ascending random forest algorithm. According to the embodiments of the present application, the extraction module 830 may include, for example, but not limited to, a convolutional neural network (CNN). The extraction module 830 may specifically extract each of the body part features of the two or more body parts of the object in the image by the convolution neural network. In the embodiments of the present application, the pose estimation apparatus 80 may further include a network training module 805 for training the initial convolution neural network based on the difference between the part type predicted from the feature map of an image patch extracted from a preset training data set and the reference part type of the image patch to obtain the convolution neural network. However, it may be appreciated by those skilled in the art that the pose estimation apparatus 80 may include a training module for training the unit or module when extracting the feature through other units or modules. Alternatively, according to the embodiments of the present application, the pose estimation apparatus 80 may not include a network training module 805, and the present application is not intended to be limited thereto.

According to the embodiments of the present application, the prediction module 802 may include a Softmax function unit and a Logarithmic function unit. The Softmax function unit is used to perform the softmax function and the Logarithmic function unit is used to perform the logarithmic function. The Softmax function unit applies the softmax function to the feature map obtained by the extraction module 830, and then the Logarithmic function unit performs the logarithmic function on the feature map to obtain the part type score.

According to the embodiments of the present application, the optimization module 803 may be used to model a body part as a tree structure or as a cyclic structure, and the present application is not intended to be limited thereto. In addition, the optimization module 803 includes at least one message passing unit, and the optimization module 803 specifically communicates messages related to the adjacent body part of the body part and optimizes the established part type score maps through the message passing unit. For at least one point in each of the part type score maps, the message passing unit updates the value at the point to optimize the established part type score map based on the message related to the adjacent body part of the body part corresponding to the point. In the embodiments of the present application, the optimization module 803 obtains the message based on the part type score maps of the adjacent body part of the body part corresponding to each point in the part type score map. In the embodiments of the present application, the message may include the credibility of the adjacent body part of the body part corresponding to the point in the part type score map, and accordingly, the optimization module 803 may, specifically, determine the credibility of the adjacent body part based on the part type score maps of the adjacent body part of the body part corresponding to the point in the part type score map. In addition, the message may further include the credibility of the adjacent body part and the spatial compatibility between the body part and the adjacent body part, and accordingly, the optimization module 803 may also determine the spatial compatibility between the body part and the adjacent body part based on the relative position information between the body part and the adjacent body part. In addition, alternatively, the optimization module 803 may also determine the relative position information based on a first distance and a second distance, wherein the first distance represents a distance between the body part and the adjacent body part in an x-axis direction, and the second distance represents a distance between the body part and the adjacent body part in a y-axis direction. In the embodiments of the present application, the optimization module 803 may specifically determine the relative position information based on the first distance, the second distance, the square of the first distance and the square of the second distance. For at least one point in each of the part type score maps, the optimization module 803 may optimize the established part type score map by a credibility propagation algorithm based on the message related to the adjacent body part of the body part corresponding to the point. In the embodiments of the present application, the message passing unit may perform a max-sum propagation algorithm to pass the message and optimize the part type score map. However, it will be apparent to those skilled in the art that the message passing unit may also adopt other suitable methods. Each message passing unit performs message passing between points corresponding to adjacent body parts in the part type score map based on the flooding schedule, and each message passing unit performs the credibility propagation iteration for one time. In the part type score map, the point corresponding to the body part sends a message simultaneously (indicated as a solid line connection as shown in the right part of FIG. 6) to the points corresponding to each of the adjacent body parts, and the credibility of each point is updated by summing the unity potential of the credibility of each point and all incoming messages (indicated as a dashed line connection as shown in the right part of FIG. 6). Alternatively, the optimization module 803 includes three message passing units, however, the present application is not intended to be limited thereto. In the embodiments of the present application, the pose estimation apparatus 80 may further include a unit training module 806 for training, based on the difference between the part position score map predicted from the preset training set and the reference part position score map of the preset training set, the initial message passing unit to obtain the message passing unit. However, it may be appreciated by those skilled in the art that the pose estimation apparatus 80 may include a training module for training the unit or module when optimizing the part type score map through other units or modules. Alternatively, according to the embodiments of the present application, the pose estimation apparatus 80 may not include the unit training module 806, and the present application is not intended to be limited thereto.

In the embodiments of the present application, for each body part, the determining module 804 may select a position having the highest score as the position of the body part in the optimized part type score map, and select a position type corresponding to the position of the body part as the part type of the body part. Specifically, after the credibility propagation is converged, the determining module 804 obtains the optimal pose estimation according to the formula (4) and by selecting the position and type with the greatest credibility for each of the body parts.

In addition, according to the embodiments of the present application, the pose estimation apparatus 80 may also be used to perform the method of training the CNN as shown in FIG. 7, and to perform the method of training the message passing unit as shown in FIG. 8. Specifically, the pose estimation apparatus 80 may train the convolutional neural network based on the difference between the feature map extracted from the preset data set by the convolutional neural network and the reference part type of the preset data set, and train the message passing unit based on the difference between the part type score map predicted from the preset data set and the reference part position map of the preset data set. In addition, the pose estimation apparatus 80 may also jointly adjust the parameters of the CNN and the message passing unit by the difference between the predicted part position score map and the real part position score map. By jointly training of the CNN and the message passing unit, it is possible to effectively reduce the fuzziness and the difficulty in mining by combining the overall pose and training consistently. By means of the quadratic deformation constraint, the parameter space may be reduced in a regularized mode.

It should be understood that the modules or units described in the apparatus 80 correspond to the various steps in the method described with reference to FIG. 5 to FIG. 8. The operations and features described above for the file recognition method are equally applicable to the apparatus 80 and the modules contained therein, and detailed description thereof will be omitted. The corresponding modules in the apparatus 80 may be cooperating with modules or units in the terminal device and/or server to implement the solution of the embodiments of the present application.

The various component embodiments of the present application may be implemented in hardware, or implemented in software modules running on one or more processors, or in a combination thereof. It should be appreciated by those skilled in the art that some or all of the functions of some or all of the components of the device that acquires application information according to the embodiments of the present application may be implemented using a microprocessor or a digital signal processor (DSP) in practice. The present application may also be implemented as devices or apparatus programs (e.g., computer programs and computer program products) for performing a part or all of the method described herein. Such a program implementing the present application may be stored on a computer-readable medium or may take the form of having one or more signals. Such signals may be downloaded from the Internet websites, either provided on the carrier signals or provided in any other forms.

The units or modules involved by the embodiments of the present application may be implemented by software or hardware. The units or modules described may also be provided in the processor. The names of these units or modules should not be considered as limiting these units or modules.

The embodiments of the present application also provide a computing device including a processor and a pose estimation apparatus provided in the respective embodiments of the present application. When the processor operates the pose estimation apparatus, the modules in the pose estimation apparatus provided by the corresponding embodiment mode are operated.

The embodiments of the present application also provide another computing device, including: a processor, a communication interface, a memory and a communication bus. Here, the processor, the communication interface and the memory perform communication with each other through the communication bus. The memory is used to store at least one instruction that causes the processor to perform operations of the steps in the pose estimation method of the present application.

Figure 10:
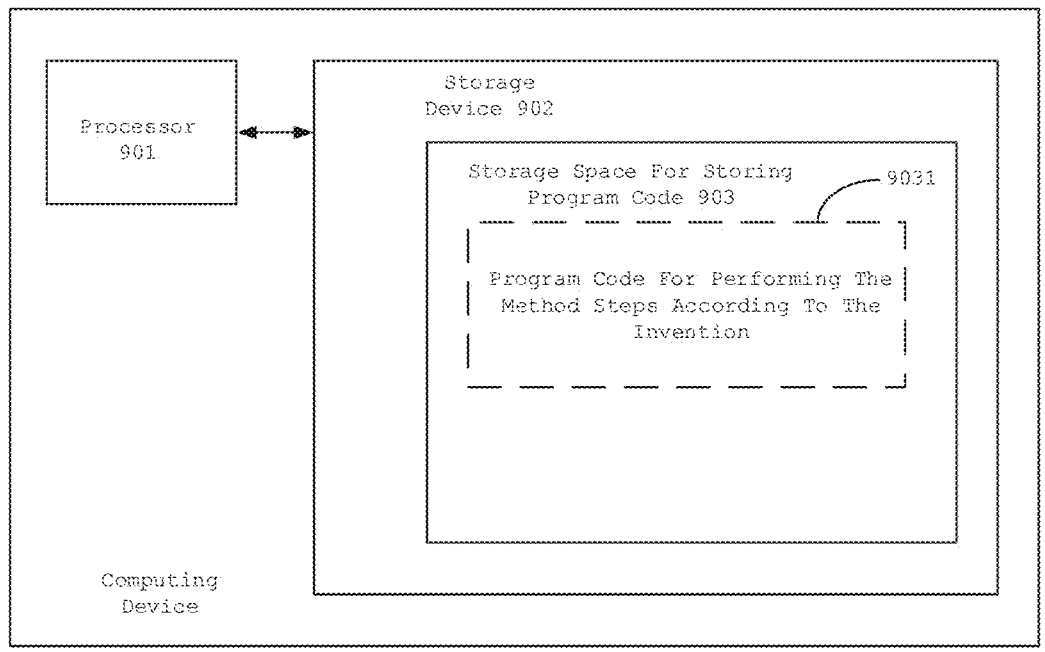
FIG. 10 shows a schematic diagram of a computing device for implementing the pose estimation method of the present application.
Figure 11:
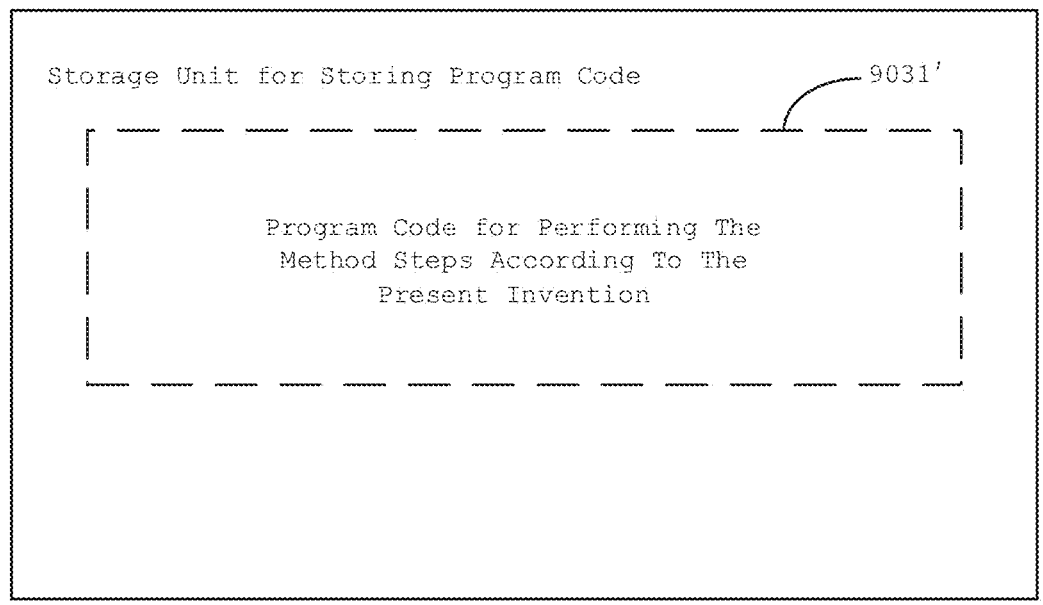
FIG. 11 shows a storage unit for holding or carrying a program code for implementing the pose estimation method according to the present application.

For example, FIG. 10 shows a computing device that may implement the pose estimation method of the present application. The computing device traditionally includes a processor 901 and a computer program product or computer-readable medium in the form of a storage device 902, in addition to a communication interface and a communication bus. The storage device 902 may be an electronic memory such as a flash memory, an EEPROM (Electrically Erasable Programmable Read Only Memory), an EPROM, a hard disk, or a ROM. The processor, the communication interface and the memory communicate with each other through the communication bus. The storage device 902 has a storage space 903 for storing program code 9031 for performing any of the method steps in the above method, for storing at least one instruction that causes the processor to execute various steps in the pose estimation method of the present application. For example, the storage space 903 storing the program code may include individual program codes 9031 for implementing the various steps respectively in the method. These program codes may be read from or written to one or more computer program products from the one or more computer program products. These computer program products include program code carriers such as hard disks, compact disks (CDs), memory cards, or floppy disks. Such computer program products are typically, for example, portable or fixed storage units as shown in FIG. 11. The storage unit may have a storage segment, a storage space, etc. arranged similarly with the storage device 902 in the computing device in FIG. 10. The program codes may, for example, be compressed in an appropriate form. Typically, the storage unit includes computer-readable codes 9031' for performing the method steps according to the present application, i.e., codes that can be read by a processor such as 901, when these codes are run by the computing device, causing the computing device to perform the steps in the method described above.

The present application also provides a computer system, the computer including:
a memory that stores an executable instruction;
one or more processors that communicate with the memory to execute the executable instruction to complete the operations of the steps in the pose estimation method of the embodiments of the present application.

The embodiments of the present application also provides a computer program including a computer-readable code that, when the computer-readable code is run on a device, the processor in the device performs an instruction for implementing the steps in the pose estimation method of the above-described embodiments of the present application.

In another aspect, the present application also provides a computer-readable storage medium, such as a non-transitory computer-readable storage medium. The computer-readable storage medium may be a computer-readable storage medium included in the apparatus of the above-described embodiments, which may also be a computer-readable storage medium that is not assembled in the apparatus. The computer-readable storage medium stores one or more programs. The computer program includes computer-readable instructions. One or more processors perform the pose estimation method described in the embodiments of the present application using the computer program. The respective embodiments of the present application are described in a progressive mode, each of the embodiments is focused on the differences from the other embodiments, and the same or similar parts between the individual embodiments may be referred to with each other.

As will be appreciated by one skilled in the art, the present disclosure may be embodied as a computer program product. Accordingly, the present disclosure may take the form of an entirely hardware embodiment, an entirely software embodiment (including firmware, resident software, microcode, etc.) or an embodiment combining software and hardware. Furthermore, the present disclosure may take the form of a computer program product embodied in any tangible medium of expression having computer-usable program embodied in the medium. The medium includes but not limited a non-transitory computer-readable storage medium.

For the apparatus and device embodiments of the present invention, since they are substantially corresponding to the method embodiments, the description is relatively simple and the relevant aspects may be referred to in part of the description of the method embodiments.

The method and display provided herein are not inherently relevant to any particular computer, virtual system, or other devices. Various general-purpose systems may also be used with and based on teachings herein. According to the above description, the structure required to construct such system is apparent. In addition, the present application is not directed to any particular programming language. It should be understood that the contents of the present application described herein may be implemented in a variety of programming languages and that the description of a particular language above is intended to disclose the preferred embodiments of the present application.

A number of specific details are described in the specification provided herein. It may be understood, however, that the present application may be practiced without these specific details. In some instances, well-known methods, structures, and techniques have not been shown in detail so as not to obscure the understanding to the this specification.

Similarly, it should be understood that the features of the present application are sometimes grouped together into a single embodiment, figure or description thereof in order to simplify the present application and to assist in understanding one or more of the various inventive aspects, as described above in the exemplary embodiments of the present application. However, the disclosed method should not be construed as reflecting the intention that the claimed application requires more features than those expressly specified in each claim. To be more specific, as reflected in the following claims, the inventive aspects are less than all the features of the single embodiment previously disclosed. Accordingly, the claims that follow a specific embodiment are expressly incorporated into the specific embodiment, wherein each claim is a separate embodiment of the present application.

It may be appreciated by those skilled in the art that the modules in the apparatus of the embodiments may be adaptively changed and placed in one or more devices that are different from the embodiment. The modules or units or components in the present application may be combined into a module or unit or component, and in addition they may be divided into a plurality of submodules or subunits or subcomponents. All of the features disclosed in this specification (including the accompanying claims, abstract and drawings) and any of the methods disclosed herein or all the processes or units of the device may be employed in any combinations, except that at least some of such features and/or processes or units are mutually exclusive. Each feature disclosed in this specification (including the accompanying claims, abstract and drawings) may be replaced by alternative features that provide the same, equivalent or similar purpose, unless otherwise expressly stated otherwise.

In addition, it may be appreciated by those skilled in the art that although some of the embodiments described herein include certain features included in other embodiments but not other features, combinations of the features of different embodiments are intended to be within the scope of the present application and form different embodiments. For example, in the following claims, any one of the claimed embodiments may be used in any mode of combination.

The flow charts and block diagrams in the accompanying drawings illustrate the possible architecture, functions, and operations of apparatus, systems, methods and computer program products in accordance with the various embodiments of the present application. In this regard, each of the blocks in the flowcharts or block diagrams may represent a module, program segment, or part of a code, the module, program segment, or part of the code containing one or more executable instructions for implementing the specified logic function. It should also be noted that in some alternative implementations, the functions noted in the block may also occur in a different order than that noted in the drawings. For example, two successive boxes may be executed substantially in parallel in practice, and they may sometimes be executed in the reverse order, depending on the function involved. It should also be noted that each block in the block diagram and/or flow chart, as well as the combination of blocks in the block diagram and/or flow chart, may be implemented with a dedicated hardware-based system that performs a specified function or operation, or may be implemented with a combination of dedicated hardware and computer instructions.

The foregoing is merely a description of the preferred embodiments of the present application and the technical principles applied. It should be understood by those skilled in the art that the application scope of the present application is not limited to the technical solution consisting of a particular combination of the above technical features. The scope of the present application should also cover other technical aspects of any combination of the technical features and equivalents thereof, without departing from the spirit of the present application. For example, the technical solution constructed by replacing the above disclosed features with technical features having similar functions is also within the scope of the present application.

What is claimed is:

1. A pose estimation method, comprising:
   extracting a feature in each body part of two or more body parts of an object in an image to generate a plurality of feature maps for the each body part, wherein the each body part corresponds to at least one part type;
   predicting part type scores respectively for features in each of the feature maps, and establishing two or more part type score maps based on the predicted part type scores;
   optimizing, for at least one point in each of the part type score maps, the established part type score maps based on a message related to an adjacent body part of a body part corresponding to the point; and
   determining an estimated position and an estimated part type of the each body part based on the optimized part type score maps to obtain an estimated pose of the object;
   wherein the optimizing the established part type score maps based on a message related to an adjacent body part of a body part corresponding to the point comprises:
   optimizing the established part type score maps by a message passing unit passing the message related to the adjacent body part of the body part, wherein the message passing unit is obtained by training an initial message passing unit based on a difference between a part position score map predicted from a preset training set and a reference part position score map of the preset training set.

2. The pose estimation method according to claim 1, wherein the message comprises credibility of the adjacent body part of the body part corresponding to the point;
   before the optimizing the established part type score maps based on a message related to an adjacent body part of a body part corresponding to the point, the method further comprising:

determining the credibility of the adjacent body part based on the part type score maps of the adjacent body part of the body part corresponding to the point.

3. The pose estimation method according to claim 2, wherein the established part type score maps are optimized by a credibility propagation algorithm based on the message related to the adjacent body part of the body part corresponding to the point.

4. The pose estimation method according to claim 2, wherein the message further comprises spatial compatibility between the body part and the adjacent body part.

5. The pose estimation method according to claim 4, before the optimizing the established part type score maps based on a message related to an adjacent body part of a body part corresponding to the point, further comprising:
  determining the spatial compatibility between the body part and the adjacent body part based on relative position information between the body part and the adjacent body part.

6. The pose estimation method according to claim 5, before determining the spatial compatibility between the body part and the adjacent body part, further comprising:
  determining the relative position information based on a first distance and a second distance, wherein the first distance represents a distance between the body part and the adjacent body part in an x-axis direction, and the second distance represents a distance between the body part and the adjacent body part in a y-axis direction.

7. The pose estimation method according to claim 1, wherein the extracting a feature in each body part of two or more body parts of an object in an image comprises:
  extracting the feature in the each of two or more body parts of the object in the image by a convolution neural network.

8. The pose estimation method according to claim 7, before extracting the feature in the each body part of two or more body parts of the object in the image by a convolution neural network, further comprising:
  training an initial convolution neural network to obtain the convolution neural network, based on a difference between a part type predicted from a feature map of an image patch extracted from a preset training data set and a reference part type of the image patch.

9. A pose estimation apparatus, comprising:
  a processor; and
  instructions to cause the processor to perform operations, the operations comprising:
  extracting a feature in each body part of two or more body parts of an object in an image to generate a plurality of feature maps for the each body part, wherein the each body part corresponds to at least one part type;
  predicting part type scores respectively for features in each of the feature maps, and establishing two or more part type score maps based on the predicted part type scores;
  optimizing, for at least one point in each of the part type score maps, the established part type score maps based on a message related to an adjacent body part of a body part corresponding to the point; and
  determining an estimated position and an estimated part type of the each body part based on the optimized part type score maps to obtain an estimated pose of the object;
  wherein the optimizing, for at least one point in each of the part type score maps, the established part type score maps based on a message related to an adjacent body part of a body part corresponding to the point further comprises optimizing the established part type score maps by a message passing unit passing the message related to the adjacent body part of the body part; and
  the operations further comprising:
  training an initial message passing unit to obtain the message passing unit, based on a difference between a part position score map predicted from a preset training set and a reference part position score map of the preset training set.

10. The pose estimation apparatus according to claim 9, wherein the message comprises a credibility of the adjacent body part of the body part corresponding to the point; and
  before the optimizing the established part type score maps based on a message related to an adjacent body part of a body part corresponding to the point, the operations further comprising:
  determine the credibility of the adjacent body part based on the part type score maps of the adjacent body part of the body part corresponding to the point.

11. The pose estimation apparatus according to claim 9, wherein the optimizing, for at least one point in each of the part type score maps, the established part type score maps based on a message related to an adjacent body part of a body part corresponding to the point specifically comprises:
  optimizing, for at least one point in each of the part type score maps, the established part type score maps by a credibility propagation algorithm based on the message related to the adjacent body part of the body part corresponding to the point.

12. The pose estimation apparatus according to claim 10, wherein the message further comprises spatial compatibility between the body part and the adjacent body part.

13. The pose estimation apparatus according to claim 12, wherein the optimizing, for at least one point in each of the part type score maps, the established part type score maps based on a message related to an adjacent body part of a body part corresponding to the point further comprises:
  determining the spatial compatibility between the body part and the adjacent body part based on relative position information between the body part and the adjacent body part.

14. The pose estimation apparatus according to claim 13, wherein the optimizing, for at least one point in each of the part type score maps, the established part type score maps based on a message related to an adjacent body part of a body part corresponding to the point further comprises:
  determining the relative position information based on a first distance and a second distance, wherein the first distance represents a distance between the body part and the adjacent body part in an x-axis direction, and the second distance represents a distance between the body part and the adjacent body part in a y-axis direction.

15. The pose estimation apparatus according to claim 9, wherein the extracting a feature in each body part of two or more body parts of an object in an image comprises:
  extracting the feature in the each of two or more body parts of the object in the image by a convolution neural network.

16. The pose estimation apparatus according to claim 15, the operations further comprising:
  training an initial convolution neural network to obtain the convolution neural network, based on a difference between a part type predicted from a feature map of an image patch extracted from a preset training data set and a reference part type of the image patch.

17. A computer program product, comprising a computer readable code; when the computer readable code runs in a device, a processor in the device executes an executable instruction for realizing the pose estimation method according to claim 1.

18. A computing device, comprising: a processor, a communication interface, a memory and a communication bus; the processor, the communication interface and the memory achieve mutual communication through the communication bus;

the memory is configured to store at least one instruction; the instruction causes the processor to perform operations of the steps in the pose estimation method according to claim 1.

\* \* \* \* \*